(12) United States Patent
Blakeman et al.

(10) Patent No.: US 11,025,506 B2
(45) Date of Patent: *Jun. 1, 2021

(54) INTERACTIVE SOFTWARE RENORMALIZATION

(71) Applicant: ServiceNow, Inc., Santa Clara, CA (US)

(72) Inventors: Colby Andrew Blakeman, San Jose, CA (US); German Andres Bertot, San Carlos, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/668,875

(22) Filed: Oct. 30, 2019

(65) Prior Publication Data

US 2020/0136925 A1 Apr. 30, 2020

Related U.S. Application Data

(63) Continuation of application No. 15/905,155, filed on Feb. 26, 2018, now Pat. No. 10,505,822.

(51) Int. Cl.
*H04L 12/24* (2006.01)
*H04L 29/06* (2006.01)
*G06F 8/71* (2018.01)

(52) U.S. Cl.
CPC ............... *H04L 41/22* (2013.01); *G06F 8/71* (2013.01); *H04L 41/082* (2013.01); *H04L 41/20* (2013.01); *H04L 67/42* (2013.01)

(58) Field of Classification Search
CPC ..... G06F 8/61; G06F 8/60; G06F 8/65; G06F 9/44526; G06F 9/453
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,799,189 B2 | 9/2004 | Huxoll |
| 6,816,898 B1 | 11/2004 | Scarpelli |
| 6,895,586 B1 | 5/2005 | Brasher |

(Continued)

*Primary Examiner* — Shean Tokuta
(74) *Attorney, Agent, or Firm* — Fletcher Yoder PC

(57) ABSTRACT

A system may include a database and server device(s) disposed within a remote network management platform. The database may contain established normalization information for a plurality of software applications installed on computing devices of a managed network. The server device(s) may be configured to: update a content library to include canonical normalization information for a particular software application of the plurality; after updating the content library, make a determination that established normalization information for the particular software application is inconsistent with the canonical normalization information for the particular software application; in response to making the determination, provide, to a client device associated with the managed network, a representation of a graphical user interface that displays (i) a suggestion to update the established normalization information for the particular software application based on the canonical normalization information for the particular software application and (ii) prompts to accept or reject the suggestion.

20 Claims, 12 Drawing Sheets

(56) References Cited

U.S. PATENT DOCUMENTS

| | | | |
|---|---|---|---|
| 7,027,411 B1 | 4/2006 | Pulsipher | |
| 7,392,300 B2 | 6/2008 | Anantharangachar | |
| 7,617,073 B2 | 11/2009 | Trinon | |
| 7,685,167 B2 | 3/2010 | Mueller | |
| 7,877,783 B1 | 1/2011 | Cline | |
| 7,933,927 B2 | 4/2011 | Dee | |
| 7,941,506 B2 | 5/2011 | Bonal | |
| 7,945,860 B2 | 5/2011 | Vambenepe | |
| 8,082,222 B2 | 12/2011 | Rangarajan | |
| 8,315,186 B2* | 11/2012 | Talpade | H04L 43/12 370/254 |
| 8,346,752 B2 | 1/2013 | Sirota | |
| 8,380,645 B2 | 2/2013 | Kowalski | |
| 8,554,750 B2 | 10/2013 | Rangaranjan | |
| 8,646,093 B2 | 2/2014 | Myers | |
| 8,683,032 B2 | 3/2014 | Spinelli | |
| 8,745,040 B2 | 6/2014 | Kowalski | |
| 8,812,539 B2 | 8/2014 | Milousheff | |
| 8,818,994 B2 | 8/2014 | Kowalski | |
| 8,907,988 B2 | 12/2014 | Poston | |
| 9,015,188 B2 | 4/2015 | Behne | |
| 9,037,536 B2 | 5/2015 | Vos | |
| 9,137,115 B2 | 9/2015 | Mayfield | |
| 9,261,372 B2 | 2/2016 | Cline | |
| 9,323,801 B2 | 4/2016 | Morozov | |
| 9,421,084 B2 | 9/2016 | Kowalski | |
| 9,467,344 B2 | 10/2016 | Gere | |
| 9,534,903 B2 | 1/2017 | Cline | |
| 9,575,738 B1* | 2/2017 | Chopra | G06F 8/60 |
| 9,613,070 B2 | 4/2017 | Kumar | |
| 9,631,934 B2 | 4/2017 | Cline | |
| 9,659,051 B2 | 5/2017 | Hutchins | |
| 9,792,387 B2 | 10/2017 | George | |
| 9,852,165 B2 | 12/2017 | Morozov | |
| 9,967,162 B2 | 5/2018 | Spinelli | |
| 10,002,203 B2 | 6/2018 | George | |
| 2011/0107307 A1* | 5/2011 | Liu | G06F 11/3664 717/125 |
| 2013/0144836 A1* | 6/2013 | Adzic | G06F 16/955 707/634 |
| 2013/0159326 A1* | 6/2013 | Kyomasu | G06F 8/61 707/754 |
| 2013/0166985 A1* | 6/2013 | Gautier | H03M 13/6513 714/752 |
| 2014/0074748 A1* | 3/2014 | Xie | G06Q 30/0282 705/347 |
| 2017/0017480 A1* | 1/2017 | Zhang | H04L 67/26 |
| 2017/0249393 A1* | 8/2017 | Nair | G06F 16/25 |
| 2018/0196723 A1* | 7/2018 | Patil | G06F 11/079 |
| 2019/0268243 A1* | 8/2019 | Blakeman | G06F 9/44505 |

* cited by examiner

Normalization Suggestions 800

| Discovery Model | Suggested Publisher | Suggested Product | Suggested Version | Suggested Edition | Suggested Platform | Suggested Language |
|---|---|---|---|---|---|---|
| ⓘ Adobe Photoshop CC 2017 18.1.1 — 804 | Adobe Systems | Photoshop | CC 2017 | Professional ← 808 | Windows ← 810 | ---Anything--- |
| ⓘ Adobe Illustrator CC 2015.3.1 — 806 | Adobe Systems | Photoshop | CC 2015 | Professional | Windows | English ← 812 |

INTERACTIVE SOFTWARE RENORMALIZATION

CROSS-REFERENCE TO RELATED APPLICATIONS

This application is a continuation of and claims priority to U.S. patent application Ser. No. 15/905,155, filed Feb. 26, 2018, which is hereby incorporated by reference in its entirety.

BACKGROUND

An enterprise may use many computing devices to efficiently facilitate and manage its many interrelated operations. Each such computing device may have one or more software applications installed thereon. Where the software is proprietary, the enterprise may procure licenses for the computing devices to use the software. Given this, the enterprise may desire to maintain accurate identifying information about its software applications, so that the enterprise can properly track usage of software applications and to what degree such usage complies with licenses associated with the software applications.

SUMMARY

In practice, a system may provide a remote network management platform that manages a managed network of an enterprise. The system may collect identifying information about instances of software applications installed on computing devices in the managed network, and may store this information in a database. Additionally, the system may normalize the identifying information collected for each such instance. Generally, the process of normalization may involve updating identifying information stored in the database for a particular software application based on canonical normalization information that is stored in a content library.

For example, identifying information stored in the database for an instance of software application "A" may specify that publisher "X" is the publisher for software application A. But canonical normalization information stored in the content library may specify that publisher "Y" is the publisher for the software application A. As a result, based on this canonical normalization information, the system may update the identifying information stored in the database to instead specify that publisher Y is the publisher for software application A.

In some situations, however, the content library may initially not include canonical normalization information for a particular software application, and thus normalization information for this software application may be manually entered, such as following a prompt displayed on a graphical user interface (GUI) of a client device. After establishing normalization information for the particular software application by way of such manual entry, the content library may eventually be updated to include canonical normalization information for the particular software application. At question then is whether or not the manually established normalization information for the particular software application should be updated to conform to the canonical normalization information at issue.

Generally, such a decision as to whether or not to update manually established normalization information is important for various reasons. For example, the system may maintain software entitlement records, which provide information about software license rights held by the managed network. And in order for the system to properly track license compliance for the particular software application, identifying information about this software application should be consistent with corresponding identifying information in a software entitlement record for this software application. So given that manually established normalization information may or may not include accurate identifying information that is consistent with corresponding identifying information in the software entitlement record, the decision at issue may impact tracking of license compliance for the software application. Other examples are also possible.

In accordance with the present disclosure, the system may provide a normalization suggestion to a client or server device of the managed network, so as to help the enterprise evaluate whether or not manually established normalization information should be updated.

In particular, after the content library is updated to include the canonical normalization information for the particular software application, the system may make a determination that the established normalization information for the particular software application is inconsistent with this canonical normalization information. Responsively (e.g., at a later time), the system may then cause a client or server device of the managed network to display, via a GUI, (i) a suggestion to update the established normalization information for the particular software application based on the canonical normalization information for the particular software application and (ii) prompts to accept or reject the suggestion.

Generally, this displayed suggestion could indicate one or more differences between the established normalization information and the canonical normalization information. For example, the displayed suggestion could indicate that publisher "Z" was manually entered as the publisher for software application "B", and could indicate publisher "W" as a suggested publisher that should be specified for the software application B. In this way, the system could provide an enterprise with the opportunity to review manually established normalization information and to evaluate whether or not such information should be updated based on newly obtained canonical normalization information.

As such, if the system then receives, from the client device, an acceptance of the suggestion via the GUI, the system may responsively update the established normalization information for the particular software application based on the canonical normalization information for the particular software application. On other hand, if the system then receives, from the client device, a rejection of the suggestion via the GUI, the system may responsively maintain the established normalization information for the particular software application.

Given such normalization suggestions, an enterprise can thus better maintain accurate identifying information about its software applications, so that the enterprise can properly track usage of software applications and to what degree such usage complies with licenses associated with the software applications.

Accordingly, a first example embodiment may involve a system including a database and one or more server devices disposed within a remote network management platform that manages a managed network. The database may contain established normalization information for a plurality of software applications installed on computing devices of the managed network, where at least some of the software applications were discovered by the remote network management platform indirectly accessing the computing devices, and where the established normalization information includes respective indications of vendors, application titles, and application versions of each of the software applications. Additionally, one or more server devices may be configured to: update a content library to include canonical normalization information for a particular software application of the plurality of software applications; after updating the content library, make a determination that the established normalization information for the particular software application is inconsistent with the canonical normalization information for the particular software application; and in response to making the determination, provide, to a client device associated with the managed network, a representation of a graphical user interface that displays (i) a suggestion to update the established normalization information for the particular software application based on the canonical normalization information for the particular software application and (ii) prompts to accept or reject the suggestion.

A second example embodiment may involve updating, by one or more server devices disposed within a remote network management platform that manages a managed network, a content library to include canonical normalization information for a particular software application of a plurality of software applications, where a database is also disposed within the remote network management platform, where the database contains established normalization information for the plurality of software applications, wherein the plurality of software applications are installed on computing devices of the managed network, where at least some of the software applications were discovered by the remote network management platform indirectly accessing the computing devices, and where the established normalization information includes respective indications of vendors, application titles, and application versions of each of the software applications. The second example embodiment may also involve, after updating the content library, making a determination, by the server devices, that the established normalization information for the particular software application is inconsistent with the canonical normalization information for the particular software application. The second example embodiment may further involve, in response to making the determination, providing, by the server devices to a client device associated with the managed network, a representation of a graphical user interface that displays (i) a suggestion to update the established normalization information for the particular software application based on the canonical normalization information for the particular software application and (ii) prompts to accept or reject the suggestion.

In a third example embodiment, an article of manufacture may include a non-transitory computer-readable medium, having stored thereon program instructions that, upon execution by one or more server devices, cause the one or more server devices to perform operations in accordance with the first and/or second example embodiment.

In a fourth example embodiment, one or more server devices may include at least one processor, as well as memory and program instructions. The program instructions may be stored in the memory, and upon execution by the at least one processor, cause the one or more server devices to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 depicts a graphical user interface that displays a list of configuration items having associated normalization suggestions, in accordance with example embodiments.

DETAILED DESCRIPTION

Figure 1:
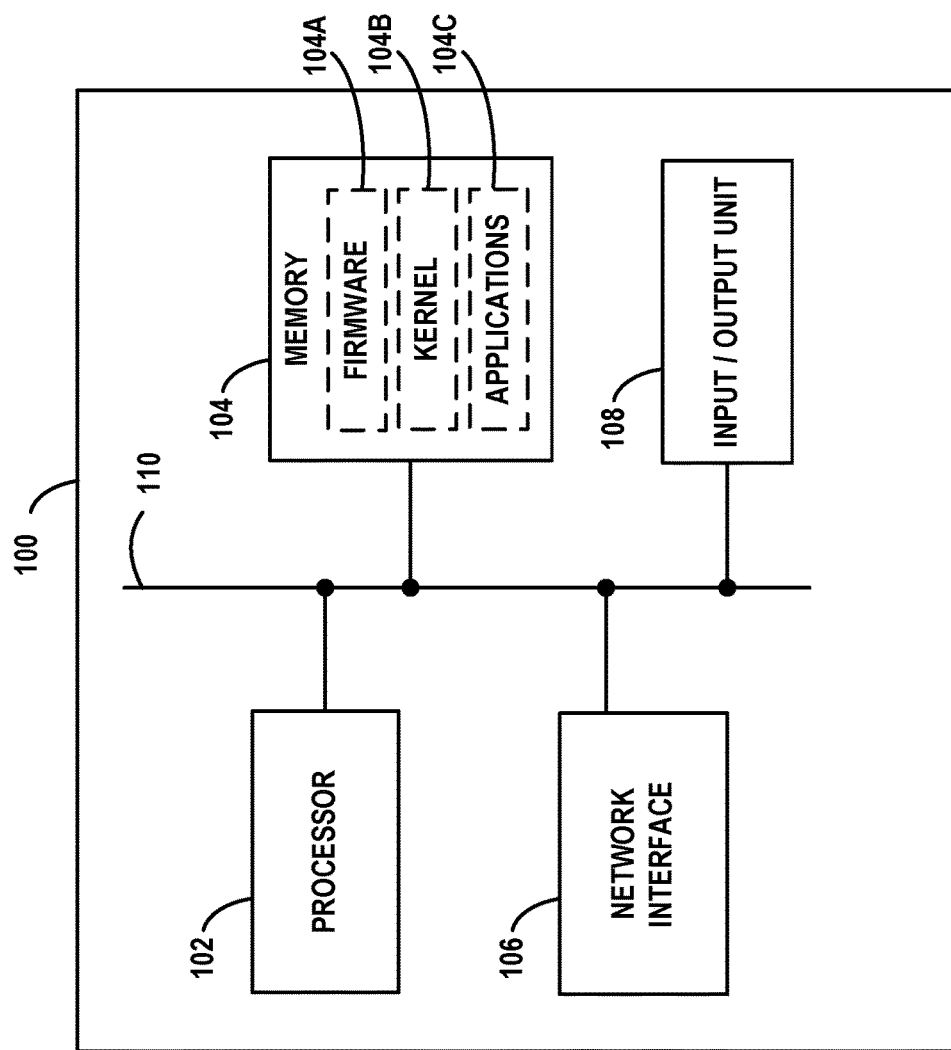
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
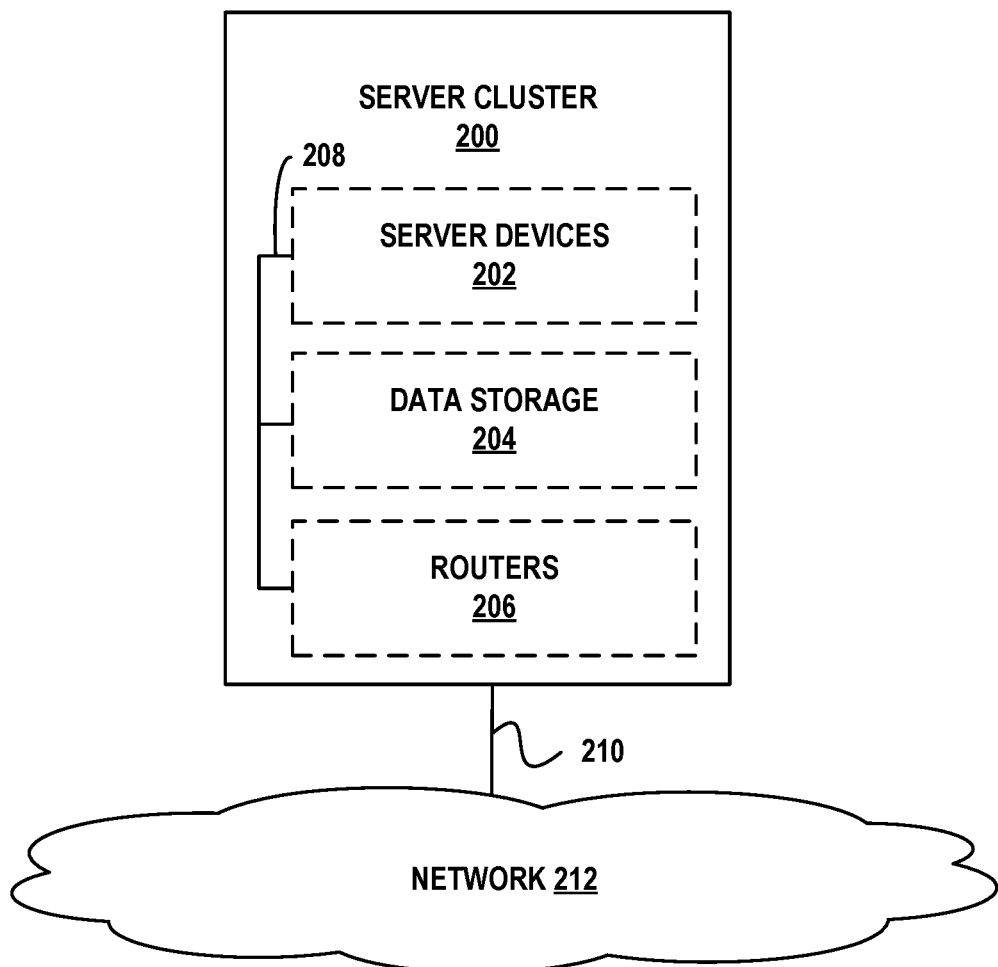
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
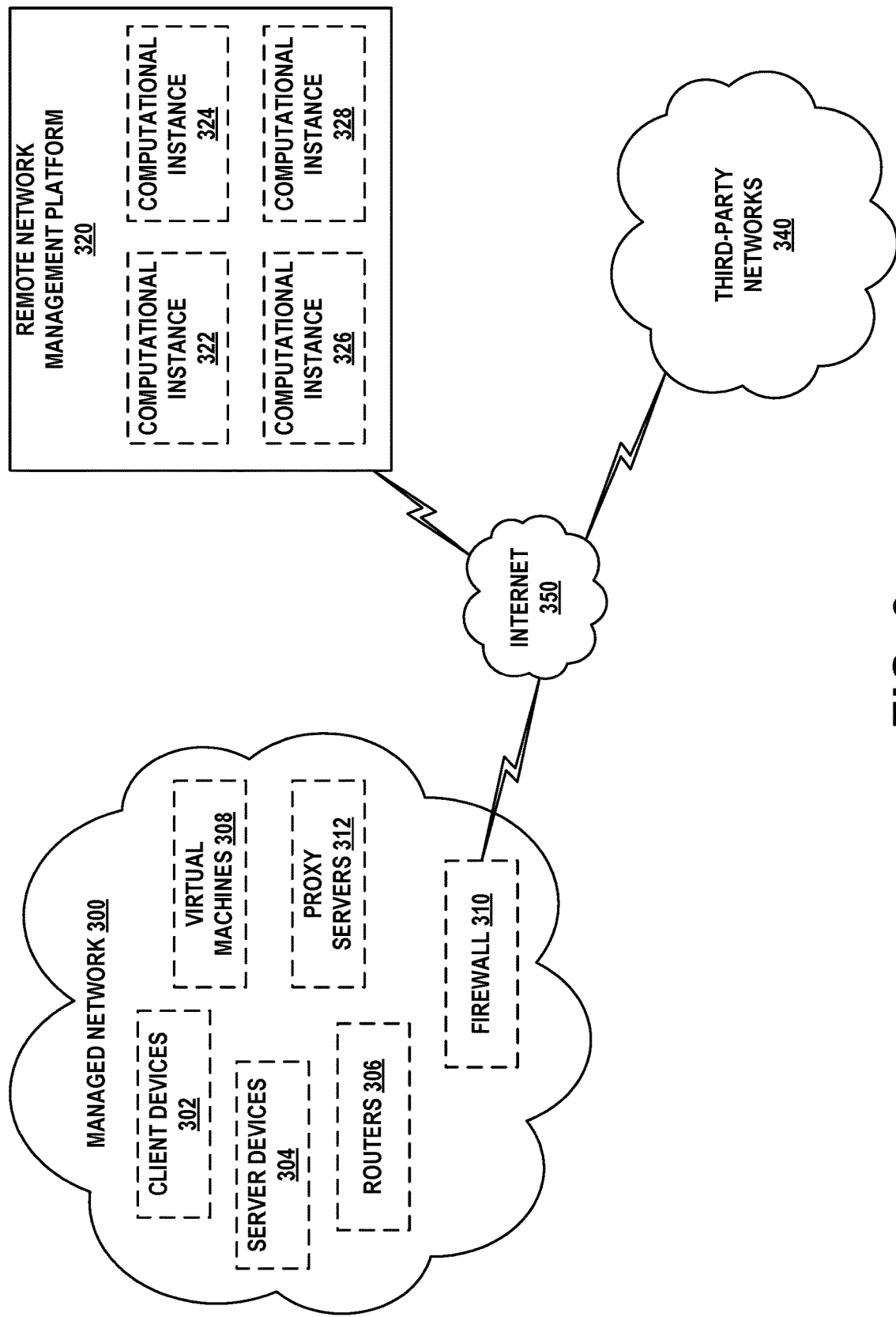
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
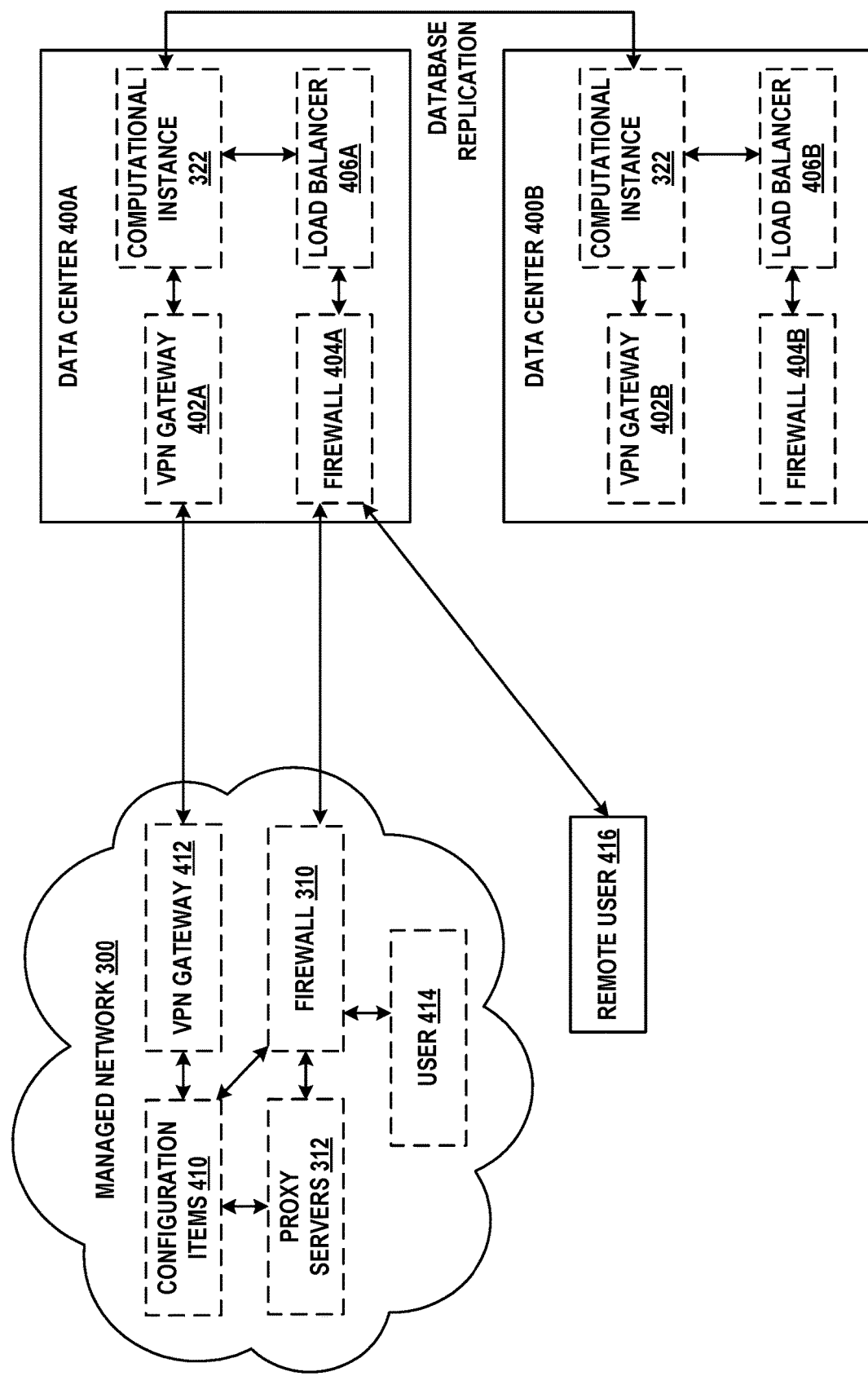
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
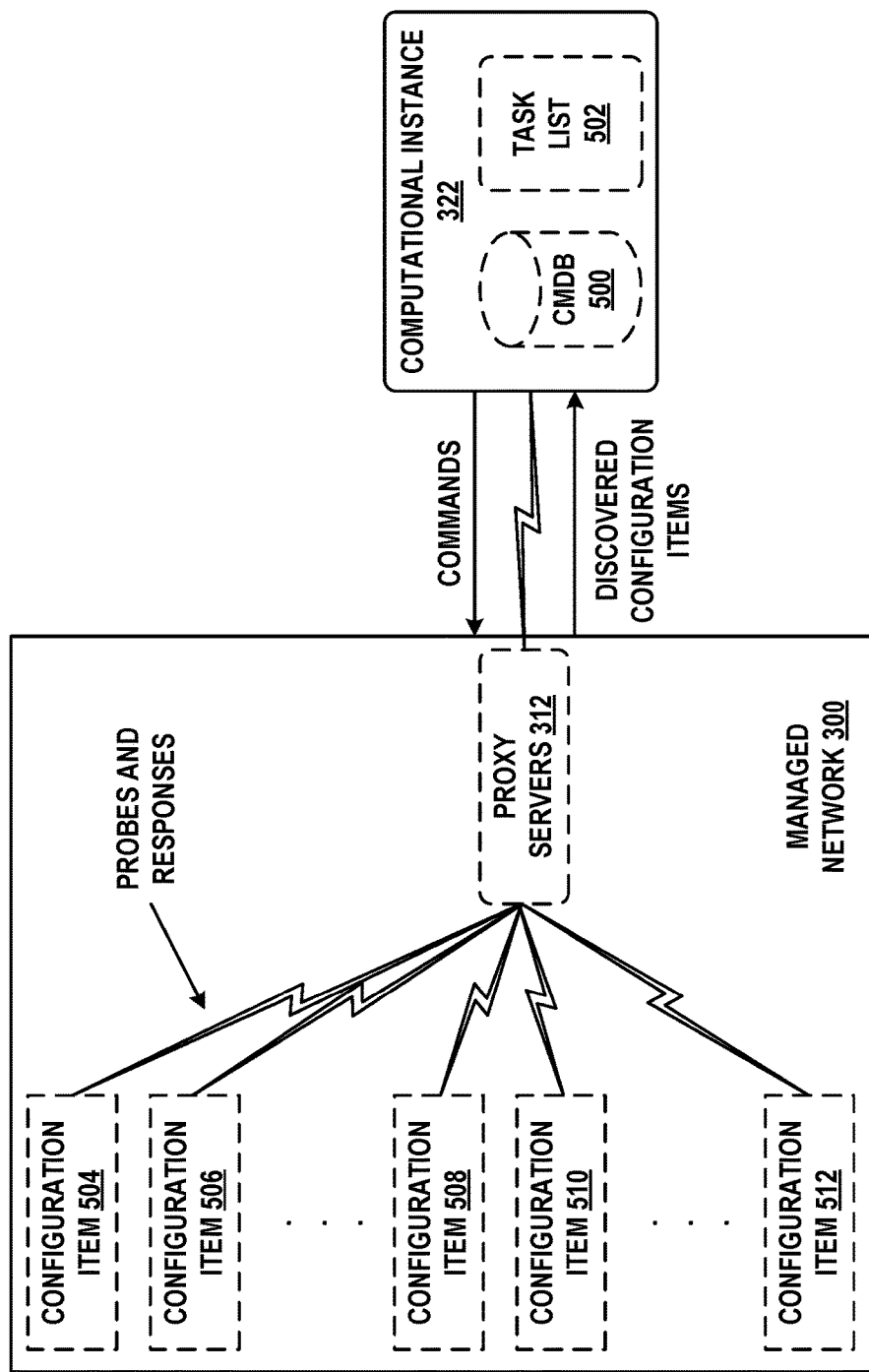
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
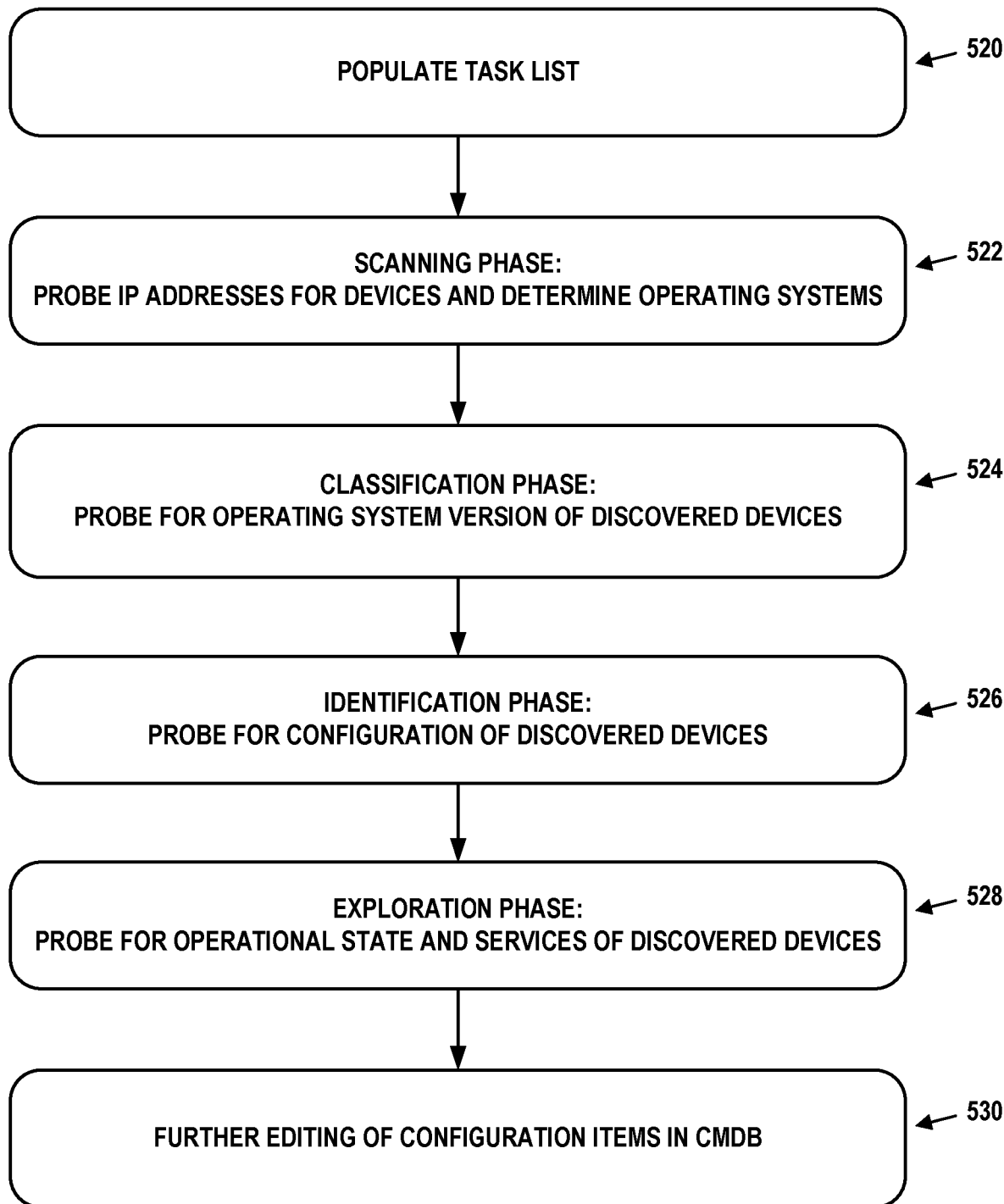
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB IDENTIFICATION RULES AND RECONCILIATION

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Example Normalization of Configuration Items

During each phase of discovery, various modules of computational instance 322 may process the responses to the probes sent from proxy servers 312. Such processing may assist in identifying various characteristics of the devices, applications, services, and relationships represented by the responses. After processing the responses, the modules may update configuration items stored in the CMDB 500 such that these configuration items more accurately represents a device, application, service, or relationship that is present in the managed network. Such processing and updating of configuration items may be referred to as normalization.

Figure 6A:
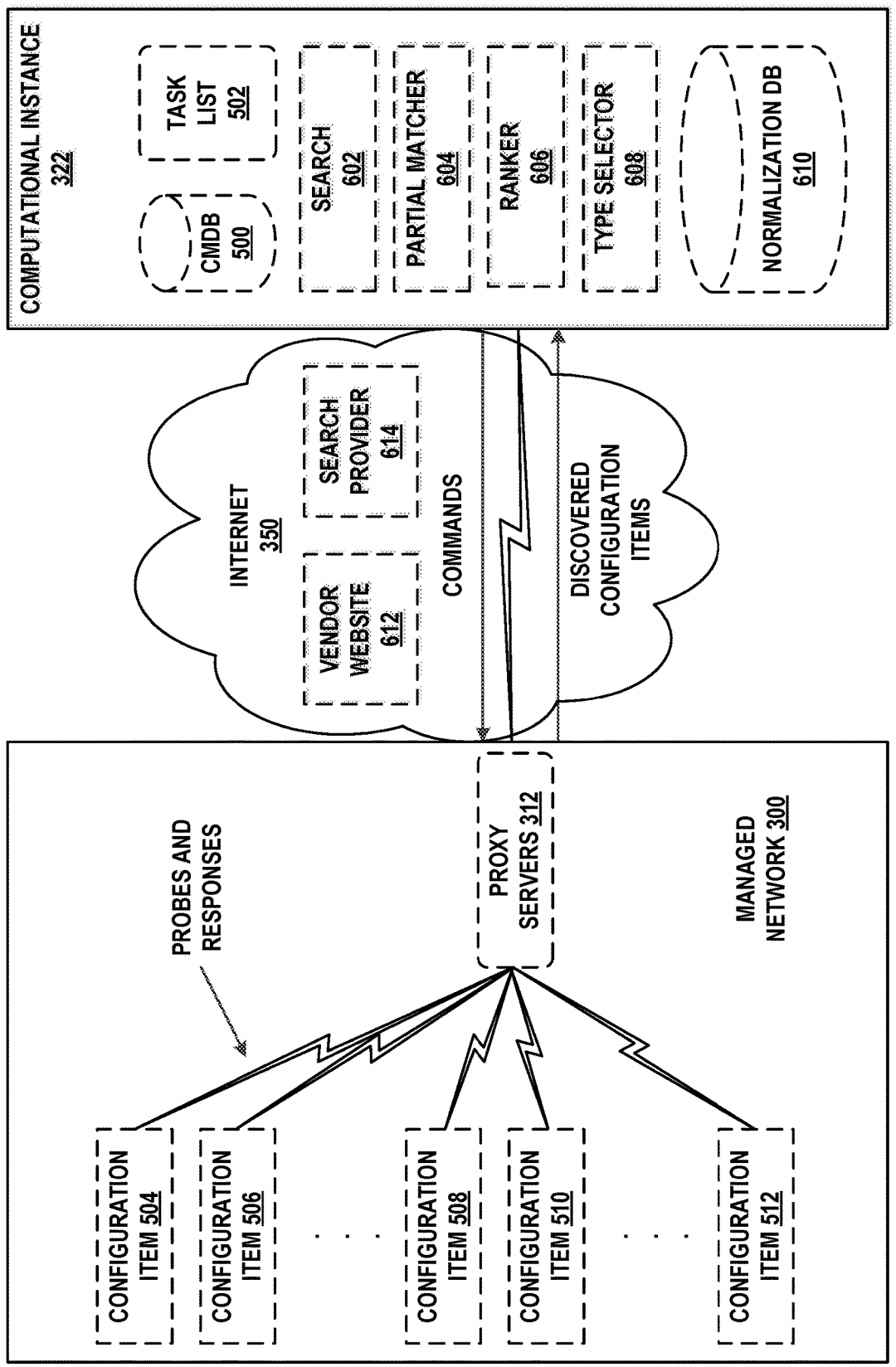
FIG. 6A depicts another communication environment involving a remote network management architecture, in accordance with example embodiments.

FIG. 6A provides a logical depiction of how configuration items can be normalized, as well as how normalized information related to discovered configuration items can be stored. For sake of simplicity, remote network management platform 320 and third-party networks 340 are not depicted. Though FIG. 6A includes additional details not included in FIG. 5A, it should be understood that the discovery process described above may be performed in conjunction with the additional features described with regard to FIG. 6A.

In FIG. 6A, CMDB 500, task list 502, search module 602, partial matcher module 604, ranker module 606, type selector module 608, and normalization database 610 are stored within computational instance 322. Computational instance 322 may include one or more server devices that transmit, via Internet 350, discovery commands to a proxy server application associated with proxy servers 312. In response, proxy servers 312 may transmit probes to various computing devices disposed within managed network 300. These devices may transmit responses to proxy servers 312, and proxy servers 312 may then provide information regarding discovered configuration items to CMDB 500 for storage therein. Search module 602, partial matcher module 604, ranker module 606, type selector module 608, and normalized service type database 610 may process the information provided by proxy servers 312. Once the information provided by proxy servers 312 has been normalized, the configuration items stored in CMDB 500 may be updated. Consequently, the updated configuration items stored in CMDB 500 may more accurately represent the environment of managed network 300.

Computational instance 322 may compare information received from proxy servers 312 to data stored in the normalization database 610 to determine whether configuration items are correctly identified. Each configuration item may have several identification parameters. For example, a computing device may be represented by identification parameters that include a model, type, and operating system of the computing device. As another example, a software program may be represented by identification parameters that include a publisher, product, edition, version, and a product description of the software program. Normalization database 610 may store data representative of identification parameters associated with known devices, services, or relationships that may exist within a managed network.

Though normalization database 610 is depicted as being disposed within computational instance 322, normalization database 610 may receive additional normalization data from a normalization database that communicates with other computational instances, such as computational instances 324, 326, and 328. In other embodiments, normalization database 610 might not be disposed with a particular computational instance at all, and may store data representative of several managed networks, or even a comprehensive set of every known device, service, or relationship of any managed network associated with remote network management platform 320. In such embodiments, one or more server devices disposed within computational instance 322 may communicate with normalization database 610 to normalize the configuration items.

When comparing the information received from proxy servers 312 to the data stored in normalization database 610, computational instance 322 may determine that the identification parameters received from the proxy servers 312 are incomplete, or that they do not match identification parameters stored on the normalization database 610. In this case, computational instance 322 may invoke search 602, partial matcher 604, ranker 606, and/or type selector 608 modules to determine appropriate identification parameters to associate with the configuration item. Further, responsive to determining the appropriate identification parameters, computational instance 322 may update the configuration items stored in CMDB 500.

Search module 602 may be configured to search external information sources, such as vendor website 612 owned by a software publisher (e.g. MICROSOFT®), or search provider 614 (e.g., GOOGLE® search or BING® search). Such searches may include as key words portions of the information received from proxy servers 312. For example, received information representative of a particular configuration item may include an incomplete or unrecognized identification parameter, such as a publisher name. In response, search module 602 may search external information sources to determine the publisher name. Though only vendor website 612 and search provider 614 are displayed in FIG. 6A, other information sources, such as a vendor application programming interface (API), may be used to determine incomplete information.

Search results from search module 602 may be passed to ranker module 606, which may apply a score to each search result and rank the results based on the applied score.

The ranked search results may be passed to the type selector module 608, which selects a type of device, service, or relationship from the normalization database. To select an appropriate type of device, service, or relationship from normalization database 610, type selector module 608 may invoke partial matcher module 604. Partial matcher module 604 may determine the known identification parameters stored within normalization database 610 that match a highly ranked search result from ranker module 606.

Once a known identification parameter has been selected by the type selector module 608, the configuration item associated with the initially incomplete or unrecognized identification parameter may be updated within CMDB 500.

In other examples, search 602, partial matcher 604, ranker 606, and type selector 608 modules may be unable to determine a known identification parameter stored in normalization database 610 that appropriately corresponds to the configuration item associated with the initially incomplete or unrecognized identification parameter. In such examples, a GUI may prompt a user for manual entry of normalized identification parameters associated with the configuration item. In these examples, normalization database 610 may store the newly added normalization data input into data entry fields of the graphical user interface, for use when normalizing other configuration items.

In an example scenario, computational instance 322 may receive information from proxy servers 312 that is representative of configuration item 506 and store the information in CMDB 500. Configuration item 506 may be associated with a software program installed on a computing device within managed network 300. The information may include several identification parameters, including the following: publisher: "Publisher X", product: "Product B", edition: " ", version: "Version D", OS: "Operating System Z", product description: "Publisher A Product B Edition C Version D". In this example scenario, "Publisher X" may be a misspelling of "Publisher A". Further, edition is missing entirely in the example scenario. Such errors may occur, for example, due to manual entry of the identification parameters.

Figure 6B:
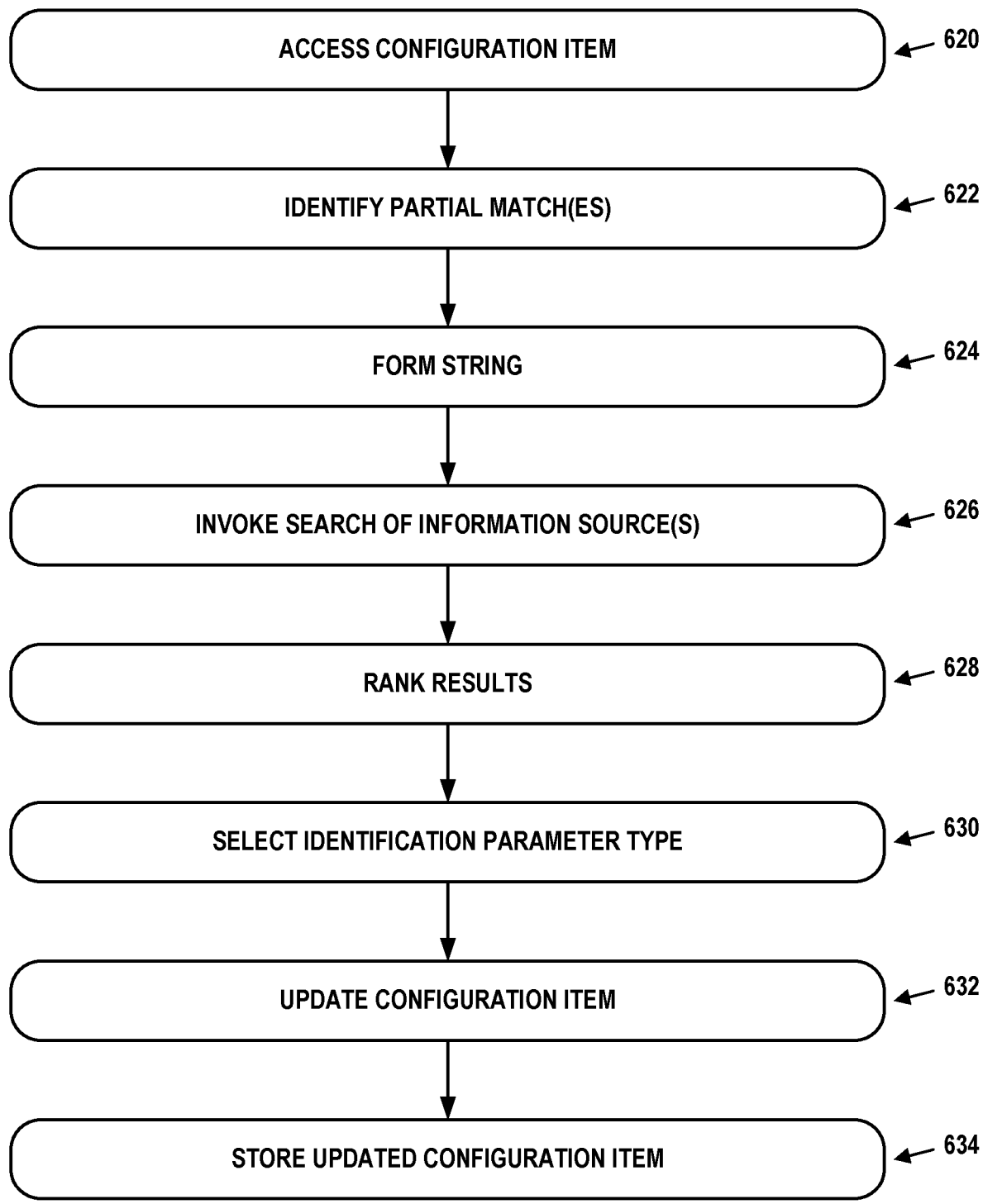
FIG. 6B is another flow chart, in accordance with example embodiments.

In the example scenario, computational instance 322 may perform the steps displayed in the flow chart of FIG. 6B to normalize configuration item 506. First, computational instance 322 may perform block 620 to access configuration item 506. In the example scenario, computational instance 322 accesses a representation of configuration item 506 by way of CMDB 500. However, in other examples, accessing the configuration item may be performed contemporaneously with receiving the information from proxy servers 312.

Second, computational instance 322 may perform block 622 to identify partial matches between the accessed configuration item and data stored in normalization database 610. In the example scenario, computational instance may compare known identification parameters stored in the normalization database 610 to the information representative of configuration item 506. These sets of data may take the form of a plurality of strings. For example, computational instance may compare the misspelled publisher "Publisher X" to known identification parameters that correspond to publishers, such as "Publisher A", "Publisher B", and "Publisher C" stored in normalization database 610.

In this example scenario, normalization database 610 might not have stored therein an identification parameter that matches incorrectly spelled "Publisher X". However, it should be understood that normalization database 610 may update include common misspellings of various software publishers, products, versions, editions, or the like. As such, in some scenarios, normalization database 610 can recognize the error in spelling without invoking the search 602, partial matcher 604, ranker 606, and type selector 608 modules. Further, it should be understood that computational instance 322 may be configured to determine the misspelled identification parameter based on additional identification parameters associated with the configuration item. For example, normalization database 610 may recognize that the publisher should be spelled "Publisher A" rather than "Publisher X" based on the product description "Publisher A Product B Edition C Version D", and computational instance 322 may affiliate this identification parameter with a publisher spelled "Publisher A". Computational instance 322, may determine additional identification parameters based on the product description parameter. For instance, in the present example, the missing edition parameter may be determined to be "Edition C" based on the product description parameter.

In the example scenario, the computational instance 322 may next perform block 624. Particularly, computational instance 322 may form a string based on the partial matches to determine the publisher and version number associated with configuration item 506. The string, for example, may simply include unrecognized term "Publisher X". However, it should be understood that other portions of data associated with configuration item 506 may be used to form the string, such as a portion of the product description parameter.

Computational instance 322 may use the string formed based on the partial matches to perform block 626. In the example scenario, search module 602 may use the formed string "Publisher X" as a search query for use in search provider 614. Search module 602 may also query scrape data from vendor website 612 to determine a close match between data in the vendor website 612 and the formed string. For example, search module 602 may scrape data from the publisher's official web site using, for example, a crawler that parses data in the official web site or automatically uses search functions provided by the official site to search for the formed string. Ranker module 606 may then perform block 628 to rank results determined by the search module 602. For example, the search results may be ranked based on a correlation between each search result and the search query. In the example scenario, the highest ranked result might not be "Publisher A". For purposes of the present example scenario, it is assumed that the highest ranked result is "Publisher A".

In the example scenario, computational instance 322 may next perform block 630 to select an identification parameter type based on the results of executed block 628. In some scenarios, no result will be determined to correspond to an identification parameter stored within normalization database 610. In this scenario, "Publisher A" may be compared to data in normalization database 610. Since "Publisher A" is a recognized identification parameter associated with a publisher, type selector module 608 may select this identification parameter from normalization database 610, may execute block 632 to update the identification parameter to reflect correct publisher "Publisher A", and may execute block 634 to store an updated identification parameter for the configuration item in CMDB 500.

Though in some examples, each of the identification parameters may ultimately be normalized, in other scenarios, some of the identification parameters may remain unidentified.

The blocks represented in FIG. 6B are for purpose of example. Normalization may be a highly configurable procedure that can include more or fewer steps, and the operations of each step may vary. In some cases, one or more steps may be customized, or may otherwise deviate from the example descriptions above.

Generally, normalization may be useful to an enterprise for various reasons. For example, each computing device of an enterprise may be tasked with performing a set of operations, and accordingly may use a combination of software applications (also referred to herein as software programs) to perform those tasks. While some such software applications may be hosted by an aPaaS system, as described above in relation to FIGS. 1 through 4, others may be installed on the individual computing, client, and/or server devices themselves. Such software is often proprietary, and may be licensed in various ways.

Regardless of the licensing scheme, the enterprise may attempt to keep track of which of its computing, client, and/or server devices use what licensed software. In so doing, the enterprise may determine whether it is in compliance with its various software licenses, whether it is using its licensed software efficiently, and whether it should purchase new software licenses.

Tracking software application usage across an entire enterprise may present challenges. A large enterprise may use thousands of separate computing devices, each of which may use a set of software applications. Further, such computing devices may go in and out of service, or require different software applications over time. Still further, different versions or builds of each software application may be installed across these computing devices.

Tracking the use of software within an enterprise may be achieved using an aPaaS system as described above in relation to FIGS. 1 through 5B, and more particularly in relation to FIGS. 6A and 6B. Such an aPaaS system may be particularly suited to tracking such software usage because the aPaaS system may gather information from computing devices in managed networks such as the enterprise. Other techniques for tracking the use of software within an enterprise are possible as well.

In any case, when gathered information is normalized in line with the discussion above, this normalization process may help the enterprise to maintain more accurate identifying information about its software applications. And given such accurate identifying information about its software applications, the enterprise can then properly track usage of software applications and to what degree such usage complies with licenses associated with the software applications. Other examples are also possible.

For at least these reasons, the embodiments described herein provide a technical improvement over previous approaches for software asset management.

VII. Example Normalization Suggestions

In some situations, normalization database 610 might not include certain normalization information for a particular software application. For instance, the normalization database 610 might not include data for a particular identification parameter associated with the particular software application. Given this, computational instance 322 might not normalize that particular identification parameter for an instance of the particular software application listed in CMDB 500. Rather, normalization of that particular identification parameter may occur via manual entry in line with the discussion above.

In such situations, normalization database 610 may later be updated to include the normalization information at issue for the particular software application, which may be referred to herein as canonical normalization information. At question then is whether manually established normalization information for the particular software application should be updated according to newly obtained canonical normalization information for the particular software application.

In some arrangements, when normalization database 610 is updated to include canonical normalization information for the particular software application, computational instance 322 may automatically renormalize the instance of the particular software application listed in CMDB 500 according to the canonical normalization information, thereby replacing manually established normalization information for the particular software application. But such automatic renormalization may not always be suitable for an enterprise.

For example, an aPaaS system may maintain software entitlement records for an enterprise's managed network, which provide information about software license rights held by the managed network. Given this, the system can compare information that the system maintains (e.g., in a CMDB) about software usage in the managed network to information in software entitlement records, so as to track to what degree software usage complies with software license rights held by the managed network.

Generally, in order for the system to properly track license compliance for a given software application, identifying information (e.g., in a CMDB) about that software application should be consistent with corresponding identifying information in a software entitlement record for this given software application. In some cases, however, at least some identifying information in the software entitlement record for the given software application may be manually entered, and manually entered normalization information for the given software application may be accurate identifying information that is consistent with the corresponding information in the software entitlement record. Thus, automatic renormalization may not be suitable in this situation, as it may replace manually entered normalization information, which could result in inconsistencies with corresponding information in the software entitlement record and in turn lead to improper tracking of license compliance. Other examples are also possible.

Disclosed herein is an arrangement that would allow an enterprise to evaluate whether or not to update manually established normalization information for a particular software application based on newly obtained canonical normalization information for the particular software application.

In accordance with the present disclosure, a remote network management platform could be arranged to provide normalization suggestion(s) for display on client device(s) associated with a managed network. Generally, a normalization suggestion for a particular software application may include suggested updates to one or more identification parameters that have been manually entered for purposes of normalization. Moreover, the displayed normalization suggestion may include prompts to accept or reject the suggestion.

Figure 7:
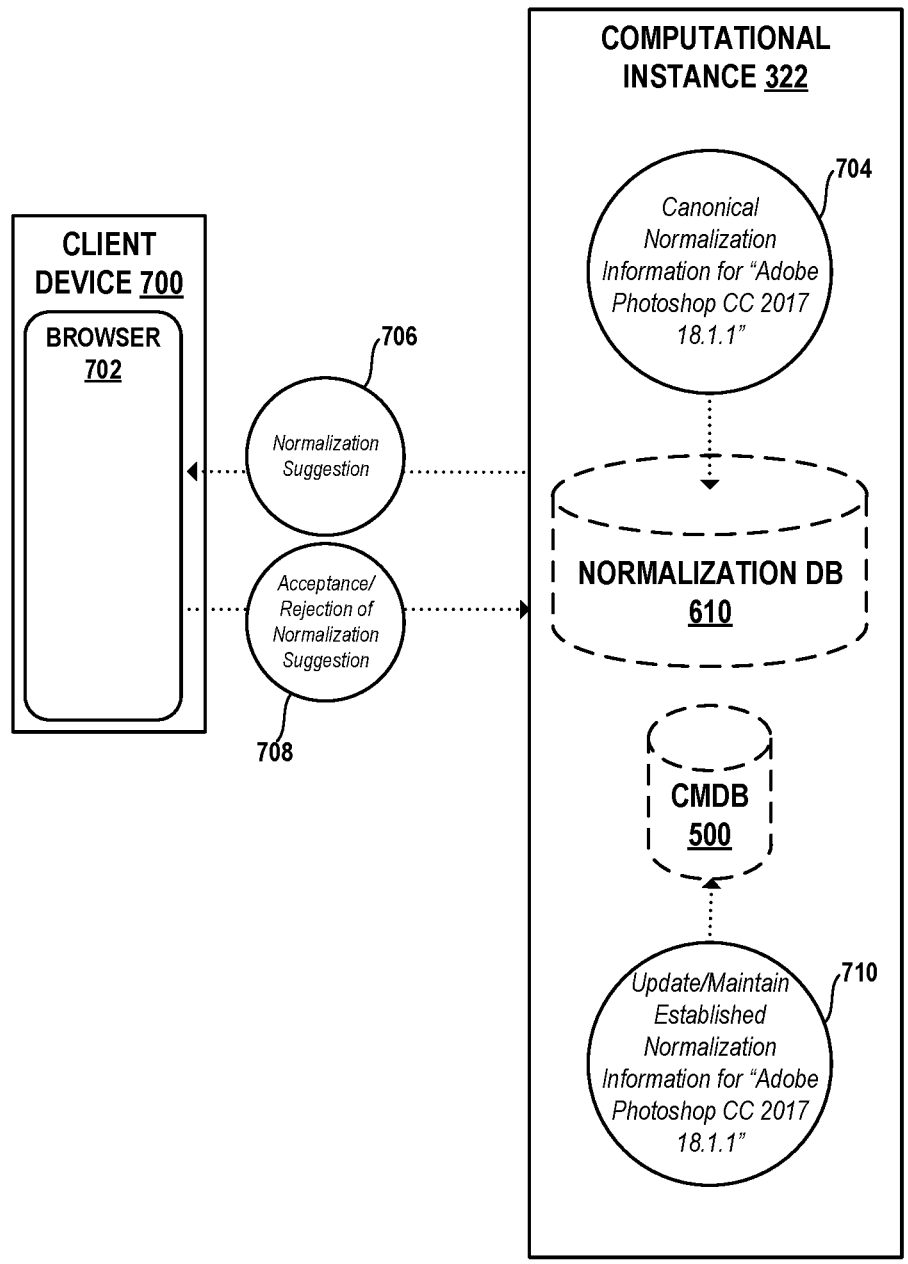
FIG. 7 depicts communication between a client device and a computational instance, in accordance with example embodiments.

FIG. 7 illustrates features, components, and operations of a system that facilitates the providing of normalization suggestion. Although FIG. 7 illustrates a specific arrangement, it should be understood that various operations disclosed herein may be carried out in the context of similar and/or other arrangement(s) as well without departing from the scope of the present disclosure.

More specifically, FIG. 7 illustrates a client device 700, which may be one of the client devices 302 on the managed network 300. Generally, the client device 700 may engage in communication with computational instance 322, such as via wired and/or wireless communication link(s) (not shown). In this regard, the computational instance 322 may include one or more server devices (not shown) that engage in communications with client device 700 and that may be disposed within a remote network management platform, such as remote network management platform 320, so as to support remote management of the client device 700's managed network.

Moreover, as shown, the client device 700 may be configured to operate a web browser 702, which is a software application that may retrieve, present, and/or navigate through information on the World Wide Web and/or on private websites. The browser 702 may include a web-display tool (not shown) that provides for or otherwise supports display of information, such as information received from the computational instance 322. For example, as further discussed herein, the web-display tool may display information related to a normalization suggestion provided by the computational instance 322. Other examples are also possible.

In FIG. 7, computational instance 322 is shown to include CMDB 500 and normalization database 610. For sake of simplicity, FIG. 7 does not depict task list 502, search module 602, partial matcher module 604, ranker module 606, and/or type selector module 608. But computational instance 322 may include any feasible combination of these and/or other features, so as to facilitate various aspects of the present disclosure.

As discussed, CMDB 500 is a database that is disposed within a remote network management platform and that contains information regarding discovered configuration items of a managed network, such as of client device 700's managed network. For example, CMDB 500 may contain established normalization information for a plurality of software applications installed on devices of the managed network.

Established normalization information for a given software application may include identification parameters for the given software application that have been normalized in accordance with the above-described process and/or that have been manually entered by a user for purposes of normalization. For example, established normalization information may contain respective indications of vendors (e.g., publishers), application titles, application versions, application editions, application platforms, and/or application languages of each of the plurality of software applications. Other examples are also possible.

Further, as discussed, normalization database 610, which could also be referred to or otherwise contain a content library, may include information representative of identification parameters associated with known devices, services, or relationships that may exist within the managed network. This information could be referred to herein as canonical normalization information. Computational instance 322 may compare information received from proxy servers 312 to canonical normalization information stored in the normalization database 610 to determine whether a configuration item, such as a discovered instance of a particular software application, is correctly identified, in line with the above-described normalization process.

In a system arranged as described above, client device 700 and computational instance 322 may engage in various communications with one another. In practice, these communications may trigger and/or may be triggered by one or more operations by respective features/components of client device 700 and computational instance 322.

Specifically, computational instance 322 may update normalization database 610 to include canonical normalization information 704 for a particular software application. In FIG. 7, that particular software application is shown by way of example to be "Adobe Photoshop CC 2017 18.1.1". Nonetheless, computational instance 322 could carry out such an update in various ways.

For example, computational instance 322 may receive and then store, in the normalization database 610, data for particular identification parameter(s) associated with the particular software application. These particular identification parameter(s) may be identification parameter(s) that were not previously stored on the normalization database 610 in association with the particular software application and/or may be updated identification parameters that replace corresponding identification parameters previously stored in the normalization database 610 in association with the particular software application.

In one case, the computational instance 322 could receive this data as part of a manual entry of the particular identification parameter(s) via a GUI, which could involve manual entry by a user associated with a managed network and/or manual entry by an individual associated with a remote network management platform. In another case, the computational instance 322 could receive this data from external information sources (e.g., a vendor website owned by a software publisher), such as part of search results obtained by search module 604. In yet another case, the computational instance 322 could receive this data from a normalization database that communicates with other computational instances, such as computational instances 324, 326, and 328. Other cases and examples are possible as well.

According to the present disclosure, after the normalization database 610 is updated to include canonical normalization information 704 for the particular software application, the computational instance 322 may make a determination that established normalization information for the particular software application is inconsistent with the canonical normalization information for the particular software application. In line with the discussion above, this inconsistency may be due to a manual entry of the established normalization information, for example.

In any case, making the determination at issue may involve comparing characteristics of the canonical normalization information for the particular software application to corresponding characteristics of the established normalization information for the particular software application. More specifically, computational instance 322 may refer to at least one configuration item in CMDB 500 that is associated with the particular software application, and may determine that this configuration item specifies identification parameter(s) that do not match corresponding identification parameters(s) specified by the canonical normalization information 704, which has been added to normalization database 610 as part of the update.

In practice, determining a difference between specified identification parameters may involve determine a difference between (i) a sequence of letters, numbers, characters, and/or other values used to specify a given identification parameter in the canonical normalization information and (ii) sequence of letters, numbers, characters, and/or other values used to specify a corresponding identification parameter in the established normalization information. But other techniques for determining such a difference are also possible.

Generally, computational instance 322 could feasibly determine a difference in association with any identification parameter indicated for the particular software application.

In one example, computational instance 322 could determine a difference between a vendor indicated by the established normalization information for the particular software application and a vendor indicated by the canonical normalization information for the particular software application.

In another example, computational instance 322 could determine a difference between an application title indicated by the established normalization information for the particular software application and an application title indicated by the canonical normalization information for the particular software application.

In yet another example, computational instance 322 could determine a difference between an application version indicated by the established normalization information for the particular software application and an application version indicated by the canonical normalization information for the particular software application.

In yet another example, computational instance 322 could determine a difference between an application edition indicated by the established normalization information for the particular software application and an application edition indicated by the canonical normalization information for the particular software application.

In yet another example, computational instance 322 could determine a difference between an application platform indicated by the established normalization information for the particular software application and an application platform indicated by the canonical normalization information for the particular software application.

In yet another example, computational instance 322 could determine a difference between an application language indicated by the established normalization information for the particular software application and an application language indicated by the canonical normalization information for the particular software application. Other examples are also possible.

In a more specific example scenario, established normalization information for "Adobe Photoshop CC 2017 18.1.1" might not specify an application edition and also may not specify an application platform. In practice, the edition and platform may be missing entirely in the established normalization information, for example, due to manual entry of these identification parameters. On the other hand, newly obtained canonical normalization information for "Adobe Photoshop CC 2017 18.1.1" may specify an application edition of "Professional" and may specify an application platform of "Windows". Thus, computational instance 322 could determine respective differences between the application editions and platforms respectively indicated by the established and canonical normalization information for "Adobe Photoshop CC 2017 18.1.1". Other example scenarios are also possible.

Once computational instance 322 makes the above-described determination, the computational instance 322 may provide a normalization suggestion 706 to client device 700, which client device 700 may display via browser 702. This can happen at any feasible time, such as automatically in response to the determination and/or in response to receiving, from the client device 700 by way of the GUI, a request to view the normalization suggestion 706, among other options. In any case, according to the present disclosure, providing the normalization suggestion 706 may involve providing a representation of a GUI that displays (i) a suggestion to update the established normalization information for the particular software application based on the canonical normalization information for the particular software application and (ii) prompts to accept or reject the suggestion.

More specifically, the normalization suggestion 706 may display one or more suggested identification parameters. The suggested identification parameters may be one or more of those indicated by canonical normalization information for the particular software application. By way of example, the normalization suggestion 706 may display a suggested vendor/publisher, a suggested application title, a suggested application version, a suggested application edition, a suggested application platform, and/or a suggested application language indicated by canonical normalization information for the particular software application. Other examples are also possible.

In some embodiments, the normalization suggestion 706 may additionally display one or more identification parameters indicated by the established normalization information. These displayed identification parameter(s) may be at least those that correspond to the suggested identification parameters, thereby displaying information that may help a user decide whether or not to accept or reject the suggestion. As such, the normalization suggestion 706 may display a vendor/publisher, an application title, an application version, an application edition, an application platform, and/or an application language indicated by the established normalization information for the particular software application. Other examples are also possible.

Further, in some embodiments, the normalization suggestion 706 may visually indicate which specific characteristics of the established normalization information for the particular software application are inconsistent with the canonical normalization information for the particular software application. For example, the normalization suggestion 706 may visually indicate which identification parameters in the established normalization information have been determined to be different from their corresponding identification parameters in the canonical normalization information for the particular software application.

In order to visually indicate such inconsistencies, the normalization suggestion 706 may include one or more graphical indicators each indicating a determined difference. In practice, each such graphical indicator could take on any feasible size, shape, and/or color etc. For example, a graphical indicator could be a red or blue dot, among other possibilities. Additionally, a given graphical indicator may be displayed within the normalization suggestion 706 in substantial proximity to a displayed identification parameter, so as to visually indicate that there is an inconsistency in association with that identification parameter. For example, the normalization suggestion 706 may display a blue dot in substantial proximity to a displayed suggested application edition, so as to visually indicate that there is a difference between the suggestion application edition and an application edition specified by the established normalization information for the particular software application.

Generally, such graphical indicators provide a technical improvement over existing approaches. For example, an enterprise's review of inconsistencies in normalization information can be time consuming, prone to errors, and often times not possible, as an enterprise may include thousands of devices having thousands of software applications installed thereon, with such devices and software often being added and/or removed. Thus, the graphical indicators may more accurately and dynamically identify inconsistencies in normalization information, and may significantly speed up an enterprise's evaluation/decision as to whether to update or maintain established normalization information. Other examples are also possible.

As such, the normalization suggestion 706 could include graphical indicator(s) in association with various identification parameter(s).

In one example, the normalization suggestion 706 may display a graphical indication of a difference between a vendor indicated by the established normalization information for the particular software application and a vendor indicated by the canonical normalization information for the particular software application.

In another example, the normalization suggestion 706 may display a graphical indication of a difference between an application title indicated by the established normalization information for the particular software application and an application title indicated by the canonical normalization information for the particular software application.

In yet another example, the normalization suggestion 706 may display a graphical indication of a difference between an application version indicated by the established normalization information for the particular software application and an application version indicated by the canonical normalization information for the particular software application.

In yet another example, the normalization suggestion 706 may display a graphical indication of a difference between an application edition indicated by the established normalization information for the particular software application and an application edition indicated by the canonical normalization information for the particular software application.

In yet another example, the normalization suggestion 706 may display a graphical indication of a difference between an application platform indicated by the established normalization information for the particular software application and an application platform indicated by the canonical normalization information for the particular software application.

In yet another example, the normalization suggestion 706 may display a graphical indication of a difference between an application language indicated by the established normalization information for the particular software application and an application language indicated by the canonical normalization information for the particular software application. Other examples are also possible.

Still further, in some embodiments, the normalization suggestion 706 may display a graphical status indicating that the normalization suggestion 706 is a new suggestion. For example, the normalization suggestion 706 may include a section that displays "suggestion status: new". Given such a graphical status, a user could ascertain that the normalization suggestion 706 is yet to be accepted or rejected.

Yet further, as noted, the normalization suggestion 706 may display prompts to accept or reject the suggestion. In practice, such prompts could take on any feasible form that visually indicates which prompt relates to acceptance of the suggestion and which prompt relates to rejection of the suggestion. For example, the normalization suggestion 706 may display a first selectable graphical feature that specifies "accept" and a second selectable graphical feature that specifies "ignore".

Accordingly, after computational instance 322 provides the normalization suggestion 706 to client device 700, computational instance 322 may receive, from the client device 700 by way of a GUI, an indication 708 indicating acceptance or rejection of the suggestion. Generally, receipt of the indication 708 may be triggered by selection of one of the prompts displayed by the normalization suggestion 706. For example, selection of the graphical feature that specifies "accept" may trigger transmission, by the client device 700 to the computational instance 322, of an indication 708 indicating acceptance of the suggestion. On the other hand, selection of the graphical feature that specifies "ignore" may trigger transmission, by the client device 700 to the computational instance 322, of an indication 708 indicating rejection of the suggestion.

Based on whether computational instance 322 receives acceptance or rejection of the suggestion, the computational instance 322 may responsively carry out a corresponding operation 710, which could involve updating or maintaining of established normalization information.

Specifically, in response to receiving rejection of the suggestion, computational instance 322 may maintain the established normalization information for the particular software application. Namely, computational instance 322 may forgo making updates to any of the identification parameters specified in CMIDB 500 for the particular software application. For example, established normalization information for "Adobe Photoshop CC 2017 18.1.1" might not specify an application edition and also may not specify an application platform. In response to rejection of the suggestion, the application edition and platform may remain unspecified for "Adobe Photoshop CC 2017 18.1.1"

On the other hand, in response to receiving acceptance of the suggestion, computational instance 322 may update the established normalization information for the particular software application based on the canonical normalization information for the particular software application. Namely, computational instance 322 may replace one or more of the identification parameters specified in CMDB 500 for the particular software application with corresponding suggested identification parameters that were displayed as part of the normalization suggestion 706. For example, computational instance 322 could update the established normalization information for "Adobe Photoshop CC 2017 18.1.1" to specify the suggested application edition of "Professional" and to specify the suggested application platform of "Windows".

As such, computational instance 322 could feasibly update any identification parameter(s) in the established normalization information to conform to corresponding identification parameter(s) suggested according to the canonical normalization information for the particular software application.

For example, computational instance 322 may update the normalization information in CMDB 500 for an instance of the particular software application to indicate one or more of the following: a suggested vendor as indicated by the canonical normalization information for the particular software application, a suggested application title as indicated by the canonical normalization information for the particular software application, a suggested application version as indicated by the canonical normalization information for the particular software application, a suggested application edition as indicated by the canonical normalization information for the particular software application, a suggested application platform as indicated by the canonical normalization information for the particular software application, and/or a suggested application language as indicated by the canonical normalization information for the particular software application, among other possibilities.

Furthermore, when computational instance 322 receives the indication 708 from client device 700, the computational instance 322 may responsively provide, to the client device 700, an update to the above-described graphical status that causes the graphical status to indicate whether the normalization suggestion 706 was accepted or rejected. For example, the normalization suggestion 706 may be updated to display "suggestion status: accepted" if the suggestion is accepted. In another example, the normalization suggestion 706 may be update to display "suggestion status: ignored" if the suggestion is rejected. Given such an update to the graphical status, a user could ascertain that the normalization suggestion 706 has already been accepted or rejected. Other examples are also possible.

Although aspects of the present disclosure have been described in the context of a single normalization suggestion, computational instance 322 could provide two or more normalization suggestions to client device(s) of the managed network. In practice, at least some of these normalization suggestions may be in association with the same software application. Additionally or alternatively, different normalization suggestions could be associated with different software applications. In any case, established normalization information may sometimes be inconsistent with canonical information for a set of two or more software applications installed on device(s) of the managed network.

Given this, a GUI on a client device of the managed network could iteratively display different normalization suggestions respectively in different dialog boxes or windows. For example, computational instance 322 may separately provide, to client device 700, first and second representations of the GUI, which respectively relate to first and second normalization suggestions. In some cases, computational instance 322 may also provide, to client device 700, another representation of the GUI that displays a list of configuration items associated with the first and second normalization suggestions, such as selectable first and second graphical features that respectively indicate first and second configuration items. As such, a selection of the first graphical feature via the GUI may trigger display of the first representation (e.g., a dialog box or window displaying the first normalization suggestion). Whereas, a selection of the second graphical feature via the GUI may trigger display of the second representation (e.g., a dialog box or window displaying the second normalization suggestion). Other examples are also possible.

VIII. Example Graphical User Interfaces

Figure 9:
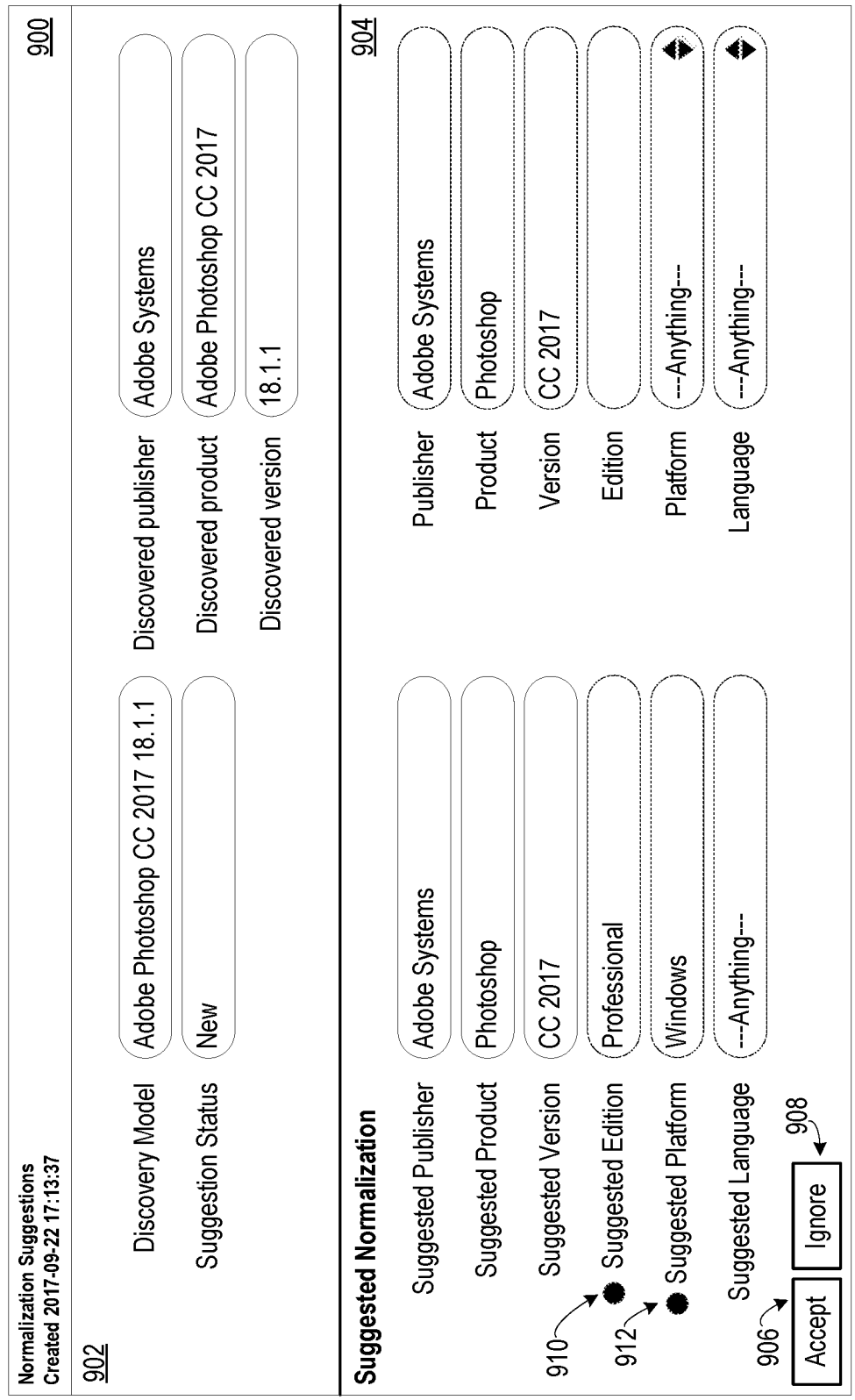
FIG. 9 depicts a graphical user interface that displays a particular normalization suggestion, in accordance with example embodiments.

FIGS. 8 and 9 depict GUIs, in accordance with example embodiments. Each of these GUIs may be provided for display on a computing device (e.g. a client device associated with managed network 300). However, it should be understood that these GUIs are merely for purposes of illustration. The applications described herein may provide GUIs that format information differently, include more or less information, include different types of information, and relate to one another in different ways.

FIG. 8 depicts an example GUI 800 that displays a list 802 of configuration items having respectively associated normalization suggestions. In particular, the GUI 800 displays a configuration item 804 that is an instance of software application "Adobe Photoshop CC 2017 18.1.1" as well as a configuration item 806 that is instance of a software application "Adobe Illustrator CC 2015.3.1". Additionally, for each such configuration item, the GUI 800 respectively displays at least some information related to its associated normalization suggestion. For example, the GUI 800 displays a suggested publisher, a suggested product, a suggested version, a suggested edition, a suggested platform, and a suggested language.

Moreover, the GUI 800 visually indicates inconsistencies between established and canonical normalization information for a given configuration item. For example, GUI 800 displays graphical indicator 808, so as to visually indicate that the suggested edition displayed by GUI 800 for configuration item 804 is different from the application edition specified in CMDB 500 for configuration item 804. In another example, GUI 800 displays graphical indicator 810, so as to visually indicate that the suggested platform displayed by GUI 800 for configuration item 804 is different from the application platform specified in CMDB 500 for configuration item 804. In yet another example, GUI 800 displays graphical indicator 812, so as to visually indicate that the suggested language displayed by GUI 800 for configuration item 806 is different from the application language stored in CMDB 500 for configuration item 806.

In GUI 800, the displayed configuration items 804 and 806 may be selectable, so as to launch associated normalization suggestions, perhaps in different window(s) and/or dialog box(s). Specifically, a selection of configuration item 804 via the GUI 800 may trigger display of a particular normalization suggestion associated with that configuration item 804. On the other hand, a selection of configuration item 806 via the GUI 800 may trigger display of a particular normalization suggestion associated with that configuration item 806. Other illustrations are also possible.

FIG. 9 depicts an example GUI 900 that displays the normalization suggestion associated with configuration item 804. GUI 900 includes a section 902, a section 904, prompt 906, and prompt 908.

As an initial matter, section 902 displays information about the configuration item 804 that was gathered by a remote network management platform, such as part of the above-described discovery process, and also provides a graphical status indicating whether the normalization suggestion is a new suggestion, has been rejected, or has been accepted. As shown, section 902 indicates a discovery model "Adobe Photoshop CC 2017 18.1.1", a discovered publisher "Adobe Systems", a discovered product "Adobe Photoshop CC 2017", a discovered version "18.1.1", and a suggestion status "New".

Section 904 displays information about suggested identification parameters as indicated by canonical normalization information for configuration item 804, identification parameters as indicated by established normalization information for configuration item 804, and also visually indicates inconsistencies between such identification parameters.

Specifically, section 904 displays a publisher "Adobe Systems", a product "Photoshop", a version "CC 2017", and does not display a particular edition, a particular platform, or a particular language for configuration item 804. Additionally, section 904 displays a suggested publisher "Adobe Systems", a suggested product "Photoshop", a suggested version "CC 2017", a suggested edition "Professional", a suggested platform "Windows", and does not display a particular suggested language for configuration item 804. Further, section 904 displays a graphical indicator 910 in substantial proximity to the displayed suggested edition, so as to visually indicate that there is a difference between the displayed suggested edition and the displayed edition indicated by established normalization information for configuration item 804. Yet further, section 904 displays a graphical indicator 912 in substantial proximity to the displayed suggested platform, so as to visually indicate that there is a difference between the displayed suggested platform and the displayed edition as indicated by established normalization information for configuration item 804.

GUI 900 also includes a prompt 906 taking the form of a selectable graphical feature that specifies "Accept", and also includes a prompt 908 taking the form of a selectable graphical feature that specifies "Ignore". In line with the discussion above, selection of prompt 906 may indicate acceptance of the suggestion. In this scenario, a computational instance may responsively update the established normalization information for configuration item 804 based on the canonical normalization information for configuration item 804, so as to specify edition "Professional" and platform "Windows" for configuration item 804. On the other hand, selection of prompt 908 may indicate rejection of the suggestion. In this scenario, the computational instance may responsively maintain the established normalization information for configuration item 804, so that still no edition and platform are specified for the configuration item 804. Other illustrations are also possible.

IX. ADDITIONAL FEATURE: SOFTWARE ENTITLEMENT IMPORTS

In yet a further aspect, also disclosed herein is an approach that may help an enterprise to maintain accurate information in its software entitlement records, which provide information about software license rights held by the enterprise's managed network. Such licensing information may include a publisher/vendor name, a publisher part number, a software name, a software model (e.g., a software name, version, and/or edition), purchased rights (e.g., number of licenses purchased/held by the managed network), a license metric, and/or license duration, among others. In any case, by maintaining both accurate identifying information about its software applications and accurate information in its software entitlement records, the enterprise can even better track to what degree software usage complies with software license rights held by the managed network.

Generally, one or more server devices of a computational instance may provide, to a client device of the managed network, a representation of GUI that displays a software entitlement import page. This page may include graphical interface feature(s) that are selectable to provide input that specifies software license rights associated with one or more software applications. In some embodiments, such input may be manually entered into data entry fields of the import page. In other embodiments, such input may be derived from a software license file that contains details of the licensed software application(s), and the respective number of licenses held by the managed network for each such licensed software application. In practice, this software license file could take the form of an electronic spreadsheet, among other possibilities.

Regardless of how input is provided via the page, the provided information may ultimately be stored by the computational instance. And such stored information could be used to determine what software program license rights are held by a managed network.

Unfortunately, however, the process of providing software license rights information via the import page could be prone to errors, as this process could be labor intensive and/or time consuming. Given this, as noted, also disclosed herein is an approach that may help an enterprise to maintain accurate information in its software entitlement records.

More specifically, when input is derived from a software license file that has been uploaded via the GUI displaying the import page, one or more server devices of a computational instance may determine whether or not the derived information include error(s).

If the server device(s) determine that the derived information does not include any errors, then the server device(s) may responsively create a software entitlement record that specifies at least a portion of the derived information. In this case, the server device(s) could provide to the client device a representation of the GUI that displays the created software entitlement record.

On the other hand, if the server device(s) determine that the derived information does include one or more errors, then the server device(s) may responsively create an error record that is associated with this software entitlement import attempt and that specifies the determined error(s). In this case, the server device(s) could provide to the client device a representation of the GUI that displays the created error record.

In this regard, when a client device displays given error record via the GUI, the displayed error record may include various types of information and features.

For example, the displayed error record may include a graphical interface feature that specifies at least one reason respectively for each error. Additionally, the displayed error record may include graphical interface feature(s) that are selectable to provide input that corrects the error(s) specified by the error record. Further, the displayed error record may include a graphical interface feature that is selectable to reject the error record (e.g., when the error record is a duplicate). Still further, the displayed error record may include a graphical interface feature that is selectable to submit correction to the errors, thereby triggering creation of a software entitlement record that includes the corrected and other information. Yet further, the displayed error record may include a graphical status that indicates whether the error record is open (e.g., correction(s) to the error(s) are yet to be submitted), is fixed (e.g., correction(s) to the error(s) have been submitted and an entitlement record has been created), or has been rejected. Other examples are also possible.

Generally, various types of errors are possible and server device(s) could determine such errors in various ways.

In one example, an error record may indicate a "duplicate entry" following an attempted software entitlement import. Such an error may be indicated when an import attempt is carried out for a software entitlement record that already exists in the aPaaS system. And server device(s) may determine a "duplicate entry" error by determining that certain information specified in the existing entitlement record matches the corresponding information provided in the attempted software entitlement import. For example, server device(s) may determine that a publisher part number, purchased rights, license metric, and license duration specified in the existing entitlement record respectively match the publisher part number, purchased rights, license metric, and license duration specified in the attempted software entitlement import.

In another example, an error record may indicate that a "publisher part number is not found". Such an error may be indicated in response to the server device(s) determining that a content library of the aPaaS system (e.g., a database specifying various publisher part numbers) does not contain a particular publisher part number inputted during the attempted software entitlement import. In this case, the displayed error record may include a graphical interface feature for adding information to the content library. Therefore, this feature could be used to add the particular publisher part number to the content library, so as to correct the error and in turn trigger generation of a corresponding software entitlement record.

In yet another example, an error record may indicate that a "software model is not found". Such an error may be indicated in response to the server device(s) determining that a content library of the aPaaS system (e.g., a database specifying various software models) does not contain a particular software model inputted during the attempted software entitlement import. Here again, the displayed error record may include a graphical interface feature for adding information to the content library. Therefore, this feature could be used to add the particular software model to the content library at issue, so as to correct the error and in turn trigger generation of a corresponding software entitlement record.

In yet another example, an error record may indicate that "multiple software models were found for a publisher part number". Such an error may be indicated when a particular publisher part number is inputted during an attempted software entitlement import, and server device(s) then determine that a content library of the aPaaS system specifies this particular publisher part number in association with two or more software application records. In this case, the displayed error record may include a graphical interface feature for selecting one of those software application records in order to more accurately specify the particular publisher part number, which may correct the error and in turn trigger generation of a corresponding software entitlement record.

In yet another example, an error record may indicate that "import template customized resulting in one or many fields being invalid". Such an error may be indicated in response to server device(s) determining that a value inputted during an attempted software entitlement import is invalid. Namely, server device(s) may determine that this inputted value is not one of a set of values that are acceptable for input in a given category. For example, acceptable values in the category "license metric" may include "per computing device", "per processor", "per processor core", or "per user". Yet, the inputted value for this category may be "per server device", which is not one of the acceptable value, thereby leading to indication of the error at issue in the error record. In this case, the error record may include a graphical interface feature for replacing the inputted value with one of the acceptable values, so as to correct the error and in turn trigger generation of a corresponding software entitlement record.

In yet another example, an error record may indicate that "purchased rights should be greater than 0". Such an error may be indicated in response to server device(s) determining that a "zero" value or no value has been specified under the category "purchased rights" during an attempted software entitlement import. In this case, the error record may include a graphical interface feature for replacing the zero or blank value with a value greater than zero, so as to correct the error and in turn trigger generation of a corresponding software entitlement record.

In yet another example, an error record may indicate "cannot ignore a fixed import record". Such an error may be indicated in response to server device(s) determining that rejection of the error record was submitted when the error record has already been fixed in line with the discussion above.

In yet another example, an error record may indicate that "publisher number already exists". Such an error may be indicated in response to server device(s) detecting an attempt to add, to a content library by way of a graphical interface feature, a publisher part number that is already specified in the content library.

In yet another example, an error record may indicate that "the publisher part number and software model conflict . . . change either the part number or the software model reference". In particular, the above-described graphical interface feature(s) could be used to add a particular publisher part number and a particular software model to a content library. And if the server device(s) determine that the particular publisher part number attempted for addition matches the particular software model attempted for addition, the server device(s) may responsively trigger indication of the error at issue by the error record.

In yet another example, an error record may indicate that "the end date must be greater than the start date". In particular, during an attempted software entitlement import, license duration may by inputted, which includes a start date and an end date of a license agreement. Given this, if server device(s) determines that an inputted end date precedes and inputted start date, the server device(s) may responsively trigger indication of the error at issue by the error record. Other examples are also possible.

X. Example Operations

Figure 10:
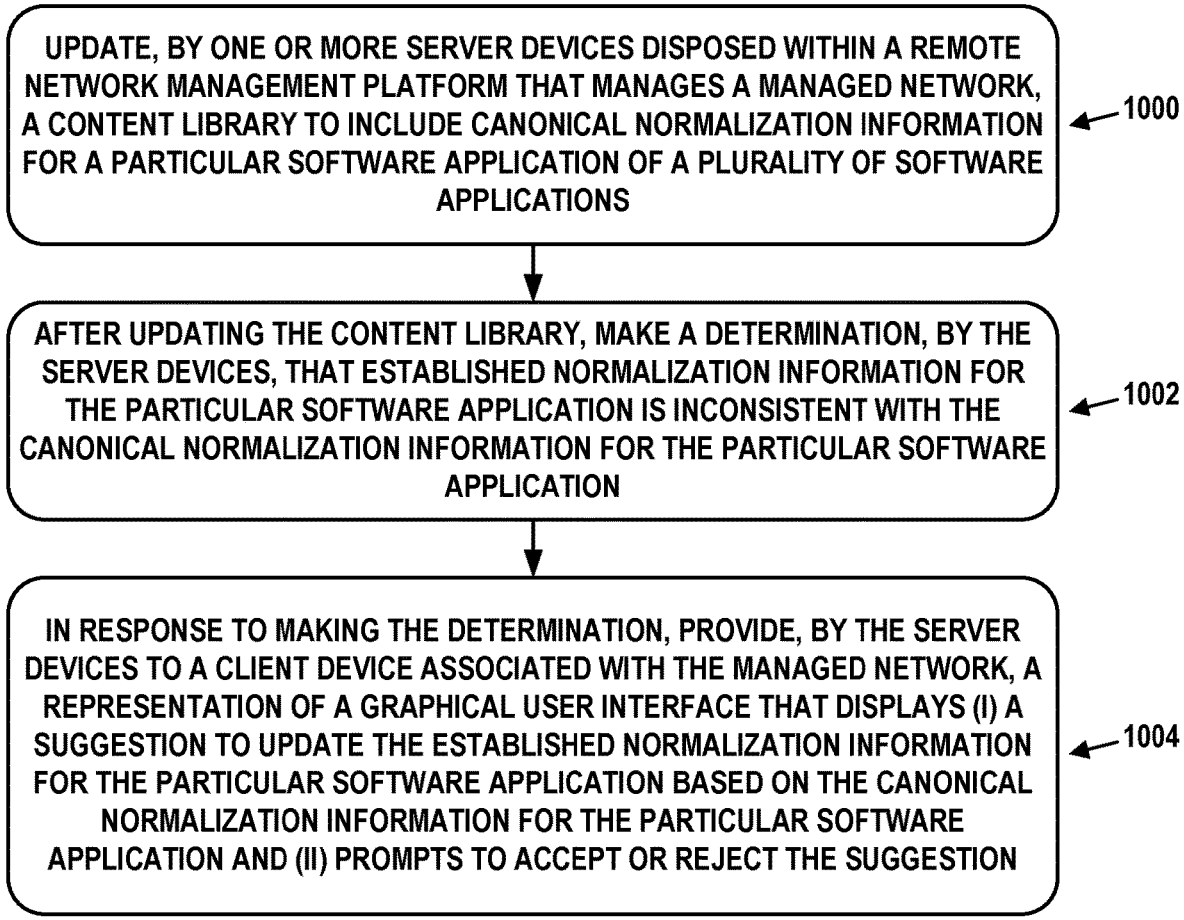
FIG. 10 is yet another flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve updating, by one or more server devices disposed within a remote network management platform that manages a managed network, a content library to include canonical normalization information for a particular software application of a plurality of software applications, where a database is also disposed within the remote network management platform, where the database contains established normalization information for the plurality of software applications, where the plurality of software applications are installed on computing devices of the managed network, where at least some of the software applications were discovered by the remote network management platform indirectly accessing the computing devices, and where the established normalization information includes respective indications of vendors, application titles, and application versions of each of the software applications.

Block 1002 may involve, after updating the content library, making a determination, by the server devices, that the established normalization information for the particular software application is inconsistent with the canonical normalization information for the particular software application.

Block 1004 may involve, in response to making the determination, providing, by the server devices to a client device associated with the managed network, a representation of a graphical user interface that displays (i) a suggestion to update the established normalization information for the particular software application based on the canonical normalization information for the particular software application and (ii) prompts to accept or reject the suggestion.

In some embodiments, the established normalization information may also include respective indications of application editions, application platforms, and application languages of each of the software applications.

In some embodiments, making the determination may involve determining one or more of the following: (i) a difference between a vendor indicated by the established normalization information for the particular software application and a vendor indicated by the canonical normalization information for the particular software application, (ii) a difference between an application title indicated by the established normalization information for the particular software application and an application title indicated by the canonical normalization information for the particular software application, or (iii) a difference between an application version indicated by the established normalization information for the particular software application and an application version indicated by the canonical normalization information for the particular software application.

In some embodiments, making the determination that the established normalization information for the particular software application is inconsistent with the canonical normalization information for the particular software application may involve: comparing characteristics of the canonical normalization information for the particular software application to corresponding characteristics of the established normalization information for the particular software application.

In some embodiments, the graphical user interface displaying the suggestion may involve the graphical user interface displaying one or more of the following: (i) a suggested vendor indicated by the canonical normalization information for the particular software application, (ii) a suggested application title indicated by the canonical normalization information for the particular software application, or (iii) a suggested application version indicated by the canonical normalization information for the particular software application.

In such embodiments, the graphical user interface displaying the suggestion may also involve the graphical user interface displaying one or more of the following: (i) a vendor indicated by the established normalization information for the particular software application, (ii) an application title indicated by the established normalization information for the particular software application, or (iii) an application version indicated by the established normalization information for the particular software application.

In some embodiments, the graphical user interface may visually indicate which specific characteristics of the established normalization information for the particular software application are inconsistent with the canonical normalization information for the particular software application.

In some embodiments, the graphical user interface displaying the suggestion may involve the graphical user interface displaying one or more of the following: (i) a graphical indication of a difference between a vendor indicated by the established normalization information for the particular software application and a vendor indicated by the canonical normalization information for the particular software application, (ii) a graphical indication of a difference between an application title indicated by the established normalization information for the particular software application and an application title indicated by the canonical normalization information for the particular software application, or (iii) a graphical indication of a difference between an application version indicated by the established normalization information for the particular software application and an application version indicated by the canonical normalization information for the particular software application.

In some embodiments, the server devices may be further configured to: in response to receiving acceptance of the suggestion by way of the graphical user interface, update the established normalization information for the particular software application based on the canonical normalization information for the particular software application.

In such embodiments, updating the established normalization information for the particular software application based on the canonical normalization information for the particular software application may involve updating the established normalization information for the particular software application to indicate one or more of the following: (i) a vendor indicated by the canonical normalization information for the particular software application, (ii) an application title indicated by the canonical normalization information for the particular software application, or (iii) an application version indicated by the canonical normalization information for the particular software application.

In some embodiments, the server devices may be further configured to: in response to receiving rejection of the suggestion by way of the graphical user interface, maintain the established normalization information for the particular software application.

In some embodiments, the graphical user interface may further display a graphical status indicating that the suggestion is a new suggestion. In such embodiments, the server devices may be further configured to: in response to receiving acceptance or rejection of the suggestion by way of the graphical user interface, provide, to the client device associated with the managed network, an update to the graphical status that causes the graphical status to indicate whether the suggestion was accepted or rejected.

In some embodiments, the established normalization information may be inconsistent with canonical normalization information for a set of two or more software applications of the plurality of software applications, and the graphical user interface may iteratively display, in different dialog boxes or windows, suggestions to update the established normalization information based on the canonical normalization information for each of the set of software applications.

XI. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
a processor; and
a memory, accessible by the processor, the memory storing instructions, that when executed by the processor, cause the processor to perform operations comprising:
receiving canonical normalization information for a configuration item (CI) associated with one or more hardware resources, one or more software resources, or both, in a managed network, wherein the CI is stored in a configuration management database (CMDB);
determining that one or more information parameters associated with the CI are inconsistent with the received canonical normalization information for the CI;
generating and transmitting, to a display device, a graphical user interface comprising an indication of a suggestion to update the one or more information parameters associated with the CI based on the received canonical normalization information for the CI;
receiving, from the display device, acceptance of the suggestion; and
updating the one or more information parameters associated with the CI to be consistent with the received canonical normalization information based on the suggestion.

2. The system of claim 1, wherein the canonical normalization information is automatically received from a database after the database is updated to include the canonical normalization information for the CI.

3. The system of claim 1, wherein one or more inconsistencies associated with the one or more inconsistent information parameters comprises an inconsistency associated with a vendor, an inconsistency associated with a software application title, an inconsistency associated with a software application platform, an inconsistency associated with a software application language, or an inconsistency associated with a software application version, or a combination thereof.

4. The system of claim 1, wherein the operations comprise determining that the one or more information parameters associated with the CI comprise manually submitted information by a user.

5. The system of claim 1, wherein the received canonical normalization information comprises compliance information associated with one or more software license rights.

6. The system of claim 1, wherein the graphical user interface comprises a prompt to accept or reject the suggestion.

7. The system of claim 1, wherein the graphical user interface comprises one or more respective indications of the one or more information parameters associated with the CI that are inconsistent with the received canonical normalization information for the CI.

8. A method, comprising:
receiving, via one or more processors, canonical normalization information for a configuration item (CI) associated with one or more hardware resources, one or more software resources, or both, in a managed network, wherein the CI is stored in a configuration management database (CMDB);
determining, via the one or more processors, that one or more information parameters associated with the CI are inconsistent with the received canonical normalization information for the CI; and
generating and transmitting, to a display device, a graphical user interface comprising an indication of a suggestion to update the one or more information parameters associated with the CI based on the received canonical normalization information for the CI.

9. The method of claim 8, comprising:
receiving, from the display device, acceptance of the suggestion; and
updating the one or more information parameters associated with the CI to be consistent with the received canonical normalization information based on the suggestion.

10. The method of claim 8, comprising:
receiving, from the display device, rejection of the suggestion; and
maintaining the one or more information parameters associated with the CI.

11. The method of claim 8, comprising:
performing, via the one or more processors, one or more discovery processes associated with the one or more hardware resources, the one or more software resources, or both, in the managed network;

receiving, via the one or more processors, information associated with the one or more hardware resources, the one or more software resources, or both, after performing the one or more discovery processes; and storing the CI in the CMDB, wherein the one or more information parameters of the CI comprise the received information associated with the one or more hardware resources, the one or more software resources, or both.

12. The method of claim 11, comprising:

determining, via the one or more processors, that normalization information associated with the CI is present in a database; and comparing, via the one or more processors, the one or more information parameters of the CI, to the normalization information after storing the CI in the CMDB.

13. The method of claim 12, comprising:

determining, via the one or more processors, that the one or more information parameters are incomplete in response to comparing the one or more information parameters and the normalization information;

querying, via the one or more processors, one or more external information sources for one or more incomplete information parameters; and updating, via the one or more processors, the CI in the CMDB based on the one or more incomplete information parameters received from the one or more external information sources.

14. The method of claim 8, wherein the canonical normalization information is automatically received from a database after the database is updated to include the canonical normalization information for the CI.

15. The method of claim 8, comprising determining that the one or more information parameters associated with the CI comprise manually submitted information by a user.

16. A non-transitory, computer-readable medium, comprising instructions that when executed by one or more processors, cause the one or more processors to perform operations comprising:

receiving canonical normalization information for a configuration item (CI) associated with one or more hardware resources, one or more software resources, or both, in a managed network, wherein the CI is stored in a configuration management database (CMDB) and the canonical normalization information comprises compliance information associated with one or more software license rights;

determining that one or more information parameters associated with the CI comprise manually submitted information by a user;

determining that the one or more information parameters associated with the CI are inconsistent with the received canonical normalization information for the CI;

generating and transmitting, to a display device, a graphical user interface comprising an indication of a suggestion to update the one or more information parameters associated with the CI based on the received canonical normalization information for the CI;

receiving, from the display device, acceptance of the suggestion; and updating the one or more information parameters associated with the CI to be consistent with the received canonical normalization information based on the suggestion.

17. The non-transitory, computer-readable medium of claim 16, wherein the graphical user interface comprises one or more respective indications of the one or more information parameters associated with the CI that are inconsistent with the received canonical normalization information for the CI.

18. The non-transitory, computer-readable medium of claim 16, wherein the canonical normalization information is automatically received from a database after the database is updated to include the canonical normalization information for the CI.

19. The non-transitory, computer-readable medium of claim 16, wherein one or more inconsistencies associated with the one or more inconsistent information parameters comprises an inconsistency associated with a vendor, an inconsistency associated with a software application title, an inconsistency associated with a software application platform, an inconsistency associated with a software application language, or an inconsistency associated with a software application version, or a combination thereof.

20. The non-transitory, computer-readable medium of claim 16, wherein the operations comprise:

performing one or more discovery processes associated with the one or more hardware resources, the one or more software resources, or both, in the managed network;

receiving information associated with the one or more hardware resources, the one or more software resources, or both, after performing the one or more discovery processes; and storing the CI in the CMDB, wherein the one or more information parameters of the CI comprise the received information associated with the one or more hardware resources, the one or more software resources, or both.

* * * * *